United States Patent [19]
Tanaka et al.

[11] Patent Number: 5,911,681
[45] Date of Patent: Jun. 15, 1999

[54] EXHAUST GAS PURIFYING APPARATUS AND METHOD FOR INTERNAL COMBUSTION ENGINE

[75] Inventors: Hiroshi Tanaka, Susono; Takaaki Itou, Misima, both of Japan

[73] Assignee: Toyota Jidosha Kabushiki Kaisha, Toyota, Japan

[21] Appl. No.: 08/867,725

[22] Filed: Jun. 3, 1997

[30] Foreign Application Priority Data

Jun. 3, 1996 [JP] Japan ................................. 8-140502

[51] Int. Cl.$^6$ ....................................................... F01N 3/20
[52] U.S. Cl. ................... 60/274; 60/287; 60/278; 123/568.21
[58] Field of Search ........................... 60/278, 274, 284, 60/285, 287; 123/568.21

[56] References Cited

U.S. PATENT DOCUMENTS

| | | |
|---|---|---|
| 3,645,098 | 2/1972 | Templin et al. . |
| 5,307,627 | 5/1994 | Christensen et al. . |
| 5,388,405 | 2/1995 | Fujishita et al. . |
| 5,632,144 | 5/1997 | Isobe .......................................... 60/277 |

FOREIGN PATENT DOCUMENTS

| | | |
|---|---|---|
| 0588315 | 3/1994 | European Pat. Off. . |
| 0640381 | 3/1995 | European Pat. Off. . |
| 4025565 | 2/1992 | Germany . |
| 0588315 | 3/1994 | Germany ........................... F01N 3/20 |
| 62-159714 | 7/1987 | Japan . |
| 62-159715 | 7/1987 | Japan . |
| 4231616 | 8/1992 | Japan . |
| 5171929 | 7/1993 | Japan . |
| 633752 | 2/1994 | Japan . |
| 6173653 | 6/1994 | Japan . |
| 797909 | 4/1995 | Japan . |

OTHER PUBLICATIONS

Patent Abstracts of Japan, vol. 095, No. 006, Jul. 31, 1995 & JP 07 071237 A (Toyota Motor Corp.), Mar. 14, 1995.

*Primary Examiner*—Willis R. Wolfe
*Assistant Examiner*—Arnold Castro
*Attorney, Agent, or Firm*—Kenyon & Kenyon

[57] ABSTRACT

To complete a regeneration process of an adsorbent adsorbing unburnt gas components, for a short period of time without making an operational condition of an internal combustion engine unstable and to prevent an ability of the adsorbent from being degraded, an exhaust gas purifying apparatus includes a first exhaust flow path and a second exhaust flow path branched downstream of the catalyst; a n adsorbent disposed in the first exhaust flow path for adsorbing unburnt gas components contained in the exhaust gas; and a recirculating device for recirculating at least part of the exhaust gas discharged from the adsorbent to an intake side of the internal combustion engine. A operational condition of the internal combustion engine is detected. A recirculation amount of the exhaust gas is changed in accordance with the detected operational condition.

13 Claims, 12 Drawing Sheets

EXHAUST GAS PURIFYING APPARATUS AND METHOD FOR INTERNAL COMBUSTION ENGINE

BACKGROUND OF THE INVENTION

The present invention relates to an exhaust gas purifying apparatus and method for purifying exhaust gas emitted from an internal combustion engine.

In an automotive internal combustion engine or the like, it is required to purify the components of exhaust gas, such as carbon monoxide (CO), nitrogen oxide (NOx), and hydrocarbon (HC) before their emission to the atmosphere.

To meet such a requirement, an exhaust gas purifying apparatus for an internal combustion engine disclosed in Japanese Patent Application Laid-Open No. Hei 5-171929 is known. In this exhaust gas purifying apparatus, there is provided an exhaust system in which an exhaust pipe downstream of a catalyst is branched into a first branch flow path and a second branch flow path and these branch flow paths are again merged into a single flow on the downstream side. Then, an adsorbent for adsorbing the hydrocarbon is provided in the first branch flow path, and an exhaust gas recirculation path is provided downstream of the adsorbent for introducing a part of the exhaust gas to the intake side of the internal combustion engine.

In the exhaust gas purifying apparatus, in the case where the catalyst is kept under non-active conditions as in the case where the internal combustion engine is started in a cold condition, the exhaust gas from the internal combustion engine is caused to flow from the catalyst to the first branch flow path and to a muffler through the adsorbent until the catalyst is activated. Thus, the hydrocarbon (HC) contained in the exhaust gas is adsorbed to the adsorbent.

Thereafter, when the catalyst is heated by the heat of the exhaust gas and the temperature of the catalyst reaches the activation temperature, the exhaust gas purifying apparatus renders the exhaust gas, which has been purified by the catalyst, to flow through both first branch flow path and second branch flow path so that the exhaust gas, which has been introduced in the first branch flow path, may flow through the adsorbent to the exhaust gas recirculation flow path and the exhaust gas, which has been introduced into the second branch flow path, may flow to the muffler.

The exhaust gas introduced into the first branch flow path causes the adsorbent to be heated and removes therefrom the hydrocarbon (HC) adsorbed to the adsorbent. The hydrocarbon (HC) separated from the adsorbent is introduced into the exhaust gas recirculation flow path together with the exhaust gas and recirculated to the intake side of the internal combustion engine.

However, in such an exhaust gas purifying apparatus, there is a fear of problems as follows.

When the recirculation amount of the exhaust gas to the intake side is increased, the combustion temperature of the mixture is lowered so that the combustion rate within the combustion chamber is delayed. As a result, the variation of the combustion period for each cycle is remarkable to cause the increase of the torque variation and to induce an uncompleted combustion or a misfire in the combustion chamber. There is a problem that the fuel consumption rate is degraded and the amount of the discharged unburnt hydrocarbon is increased.

On the other hand, if the recirculation amount of the exhaust gas is decreased, since the amount of the exhaust gas passing through the adsorbent is decreased, it takes a long time to make the temperature of the adsorbent rise. Then, in some cases, it takes a long time to separate the hydrocarbon away from the adsorbent, and the engine is at a standstill before the completion of the separation. In the case where the engine is at a standstill before the completion of the separation, the hydrocarbon is still adhered to the adsorbent, there is a problem that the adsorbing performance is degraded.

SUMMARY OF THE INVENTION

The present invention is made to overcome the above-mentioned problem. It is therefore an object of the invention to complete a regeneration process of an adsorbent adsorbing unburnt gas, for a short period of time without making an operational condition of an internal combustion engine unstable and to prevent an ability of the adsorbent from being degraded.

In order to accomplish this and other objects, the present invention adopts the following features.

Namely, an exhaust gas purifying apparatus for an internal combustion engine according to the present invention, including: an exhaust pipe connected to the internal combustion engine; a first exhaust flow path and a second exhaust flow path coupled to said exhaust pipe; a path switching means for introducing the exhaust gas into at least one of said first exhaust flow path and said second exhaust flow path; an adsorbing means disposed in said first exhaust flow path for adsorbing unburnt gas components contained in the exhaust gas; and a recirculating means for recirculating at least part of the exhaust gas discharged from said adsorbing means to an intake side of the internal combustion engine. The exhaust gas purifying apparatus is characterized by comprising a operational condition detecting means for detecting a operational condition of the internal combustion engine; and a recirculation amount changing means for changing an amount of the exhaust gas to be recirculated by said recirculating means in accordance with the operational condition detected by said operational condition detecting means.

The operational condition mentioned herein includes a load condition of the internal combustion engine, a temperature of cooling water for the internal combustion engine, and a combustion condition of the internal combustion engine.

In the thus constructed exhaust gas purifying apparatus for an internal combustion engine, the recirculation control is performed in accordance with the operational condition of the internal combustion engine. Namely, the exhaust gas purifying apparatus for the internal combustion engine opens the first exhaust flow path and closes the second exhaust flow path by the path switching means so that the exhaust gas is caused to pass through the first exhaust flow path. In this case, the exhaust gas which is introduced into the first exhaust flow path is caused to pass through the adsorbing means and the unburnt gas components contained in the exhaust gas is adsorbed into the adsorbing means.

Then, when the unburnt gas components adsorbed to the adsorbing means is separated, the path switching means causes major part of the exhaust gas from the internal combustion engine to flow through the second exhaust flow path and the rest part of the exhaust gas to flow through the first exhaust flow path. Then, the recirculating means starts the recirculation of the exhaust gas introduced into the first exhaust flow path. In this case, the exhaust gas introduced into the first exhaust path is recirculated through the adsorbing means to the intake side of the internal combustion engine by the recirculating means.

As a result, the adsorbing means is heated by the exhaust gas. Then, the temperature of the adsorbing means rises and reaches the temperature range in which the unburnt gas components adsorbed are separated from the adsorbing means. At this time, the unburnt gas components separated away from the adsorbing means is recirculated to the intake side of the internal combustion engine by the exhaust gas introduced into the first exhaust flow path. Meanwhile the recirculation amount changing means changes the amount of the exhaust gas to be recirculated to the intake side in accordance with the operational condition detected by the operation condition detecting means. Thus, for example, in the case where the operational condition of the internal combustion engine is unstable, the recirculation amount changing means reduces the amount of the exhaust gas to be recirculated in order to stabilize the operational condition of the internal combustion engine. On the other hand, in the case where the operational condition of the internal combustion engine is stable, the recirculation changing means increases the amount of the recirculation in order to accelerate the temperature rise.

Accordingly, even before the completion of the warming-up of the internal combustion engine, since the exhaust gas recirculation may be performed without making the operation of the internal combustion engine unstable, it is possible to complete the regeneration process of the adsorbing means in an early stage. It is thus possible to avoid the fear of the engine stall and to prevent the ability degradation of the adsorbing means.

Also, in the exhaust gas purifying apparatus for the internal combustion engine, it is more preferably that it further includes an activation discriminating means for discriminating whether or not a catalyst which is mounted on said exhaust pipe is activated, and said recirculating means starts the recirculation of the exhaust gas under the condition that the activation discriminating means judges that the catalyst is activated.

In this case, in the exhaust gas purifying apparatus for the internal combustion engine, the recirculation is started under the condition that the catalyst is activated. For example, in the case where it is judged by the activation discriminating means that the catalyst is not activated, the exhaust gas is caused to flow through the first exhaust flow path by the path switching means, and at the same time the recirculation is not carried out by the recirculating means. In this case, since the unburnt gas components contained in the exhaust gas are absorbed by the absorbing means, the unburnt gas is not discharged into the atmosphere even before the catalyst is activated.

On the other hand, in the case where it is judged by the activation discriminating means that the catalyst is activated, the path switching means causes major part of the exhaust gas from the internal combustion engine to flow through the second exhaust flow path and the rest part of the exhaust gas to flow through the first exhaust flow path. At the same time, the recirculating means starts the recirculation of the exhaust gas introduced into the first flow path. As a result, the exhaust gas separates the unburnt gas components adsorbed to the adsorbing means and recirculates the separated unburnt gas components to the intake side of the internal combustion engine.

In addition to the above, the exhaust gas purifying apparatus for the internal combustion engine may further comprise a water temperature detecting means for detecting a temperature of cooling water for an internal combustion engine. In this case, said recirculating amount changing means may compensates for the amount of the exhaust gas to be recirculated in accordance with the temperature of cooling water detected by said water temperature detecting means.

In this case, the recirculation amount changing means of the exhaust gas purifying apparatus for the internal combustion engine compensate for the amount of the exhaust gas to be recirculated in accordance with the temperature of the cooling water detected by the water temperature detecting means. For instance, in the case where the temperature of the cooling water is low, the recirculation amount changing means reduces the recirculation amount in order to stabilize the combustion of the internal combustion engine. On the other hand, in the case where the temperature of the cooling water rises, the recirculation amount changing means increases the recirculation amount in accordance with the temperature rise of the cooling water in order to accelerate the temperature rise of the adsorbing means.

Subsequently, the following structure for exhaust gas purifying apparatus for the internal combustion engine may be used according to the present invention.

Namely, an exhaust gas purifying apparatus for an internal combustion engine may comprise: an exhaust pipe connected to the internal combustion engine; a first exhaust flow path and a second exhaust flow path coupled to said exhaust pipe; a path switching means for introducing the exhaust gas into at least one of said first exhaust flow path and said second exhaust flow path; an adsorbing means disposed in said first exhaust flow path for adsorbing unburnt gas components contained in the exhaust gas; and a recirculating means for recirculating at least part of the exhaust gas discharged from said adsorbing means to an intake side of the internal combustion engine. The exhaust gas purifying apparatus for an internal combustion engine is characterized by comprising: a combustion condition detecting means for detecting a combustion condition of the internal combustion engine; and a recirculation amount changing means for changing an amount of the exhaust gas recirculated by said recirculating means in accordance with the combustion condition detected by said combustion condition detecting means.

In this case, in the constructed exhaust gas purifying apparatus for an internal combustion engine, the recirculation control is performed in accordance with the combustion condition of the internal combustion engine. For example, the exhaust gas purifying apparatus for the internal combustion engine opens the first exhaust flow path and closes the second exhaust flow path by the path switching means so that the exhaust gas is caused to pass through the first exhaust flow path. The exhaust gas which is introduced into the first exhaust flow path is caused to pass through the adsorbing means and the unburnt gas components contained in the exhaust gas is adsorbed into the adsorbing means.

Then, when the unburnt gas components adsorbed to the adsorbing means is separated, the path switching means of the exhaust gas purifying apparatus for the internal combustion engine causes major part of the exhaust gas from the internal combustion engine to flow through the second exhaust flow path and the rest part of the exhaust gas to flow through the first exhaust flow path. Then, the recirculating means starts the recirculation of the exhaust gas introduced into the first exhaust flow path. In this case, the exhaust gas introduced into the first exhaust path is recirculated through the adsorbing means to the intake side of the internal combustion engine by the recirculating means.

As a result, the adsorbing means is heated by the exhaust gas. Then, the temperature of the adsorbing means rises and reaches the temperature range in which the unburnt gas components adsorbed are separated from the adsorbing means. At this time, the unburnt gas components separated away from the adsorbing means is recirculated to the intake side of the internal combustion engine by the exhaust gas introduced into the first exhaust flow path. Meanwhile the recirculation amount changing means changes the amount of the exhaust gas to be recirculated to the intake side in accordance with the combustion condition detected by the combustion detecting means.

Thus, for example, in the case where it is detected by the combustion condition detecting means that the combustion condition is unstable, the recirculation amount changing means reduces the amount of the exhaust gas to be recirculated in order to stabilize the combustion of the internal combustion engine. On the other hand, in the case where it is detected by the combustion condition detecting means that the combustion condition is stable, the recirculation changing means increases the amount of the recirculation in order to accelerate the temperature rise.

As a result, when the combustion condition of the internal combustion engine is unstable due to exhaust gas recirculation, the exhaust gas purifying apparatus for the internal combustion engine according to the present invention can perform the feedback control for reducing the amount of exhaust gas recirculation in order to stabilize the combustion condition, so that even before the completion of the warming-up of the internal combustion engine, the exhaust gas recirculation may be performed without making the operation of the internal combustion engine unstable.

Accordingly, it is compatible to establish the advancement of the regeneration process of the adsorbing means in an early stage and the stabilization of the combustion of the internal combustion engine.

DESCRIPTION OF THE PREFERRED EMBODIMENTS

Embodiment 1

An exhaust purifying apparatus for an internal combustion engine according to the present invention will now be described with reference to the accompanying drawings.

The exhaust gas purifying apparatus for an internal combustion engine according to the present invention is realized by an automotive exhaust system and a controller system for controlling the exhaust system.

The automotive exhaust system for a vehicle according to the present embodiment will now first be described.

Figure 1:
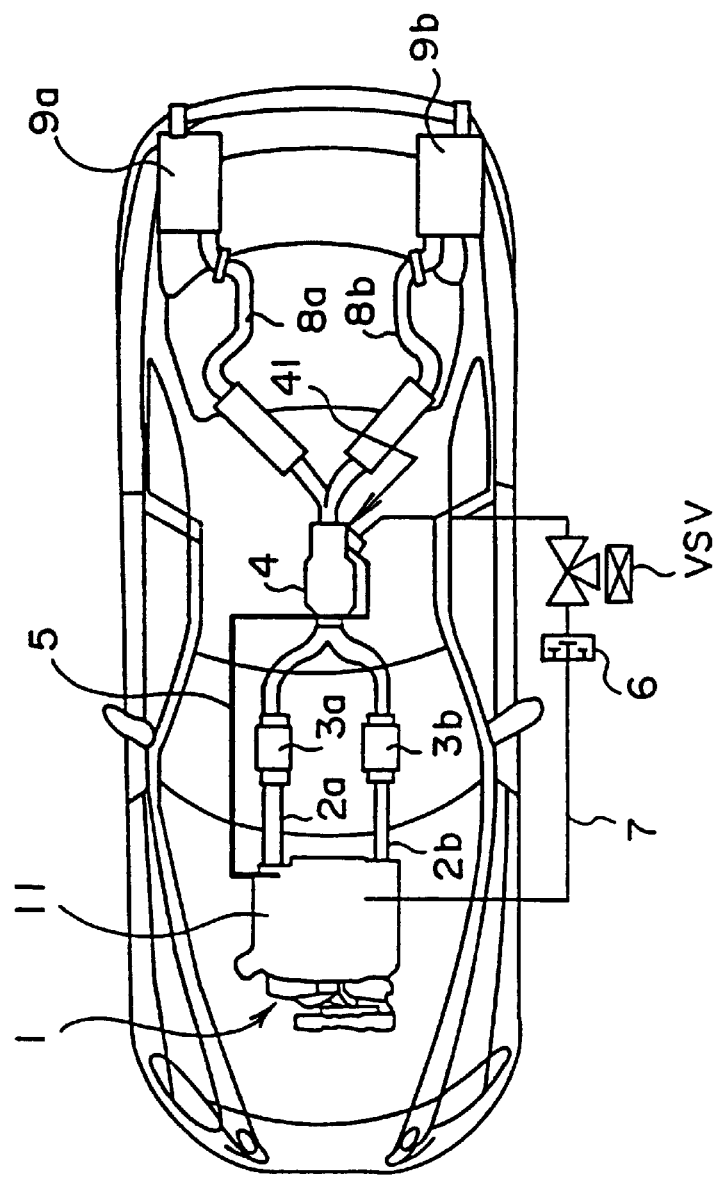
FIG. 1 is a schematic structure view showing an exhaust gas system of an automotive vehicle to which an exhaust gas purifying apparatus for an internal combustion engine according to the present invention is applied.

FIG. 1 is a schematic view showing the automotive exhaust system to which the exhaust gas purifying apparatus for an internal combustion engine according to the present invention is applied. As shown in FIG. 1, in the exhaust system, after two exhaust pipes 2a and 2b connected to an engine 1 are once emerged into a single pipe, the exhaust pipes are separated into two exhaust pipes 8a and 8b. Each of the exhaust pipes 8a and 8b is connected to a muffler 9a, 9b located in the rear side of the chassis.

Catalysts 3a and 3b for purifying the exhaust gas are provided in the two exhaust gas pipes 2a and 2b. An adsorbent sleeve 4 is provided at a portion in which the exhaust pipes 2a and 2b are merged into one downstream of the catalysts 3a and 3b.

Figure 2:
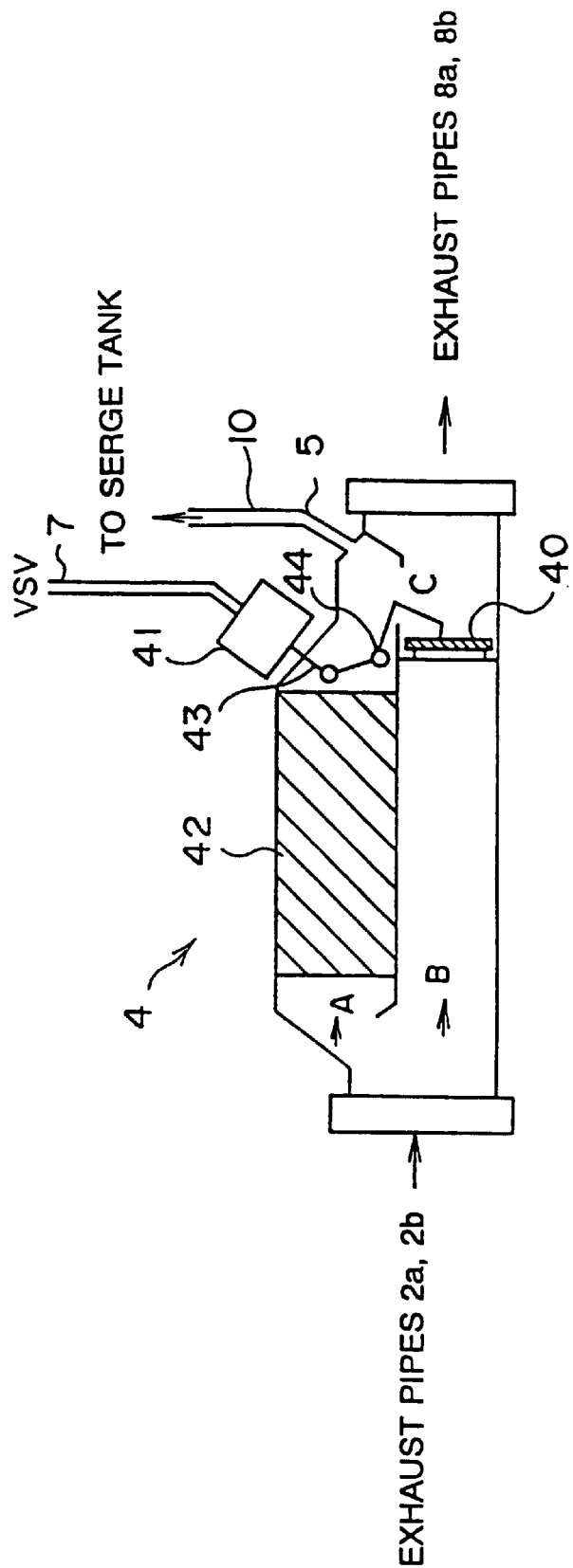
FIG. 2 is a cross-sectional view showing an internal structure of an adsorbent sleeve.

As shown in FIG. 2, the interior of the adsorbent sleeve 4 is divided into two flow paths A and B. These flow paths A and B correspond to the first gas exhaust flow path and the second exhaust gas flow path according to the present invention, respectively. For instance, a zeolite system adsorbent 42 is provided in the flow path A as the adsorbent of the present invention. The adsorbent 42 adsorbs the hydrocarbon (HC) contained in the exhaust gas.

Figure 3:
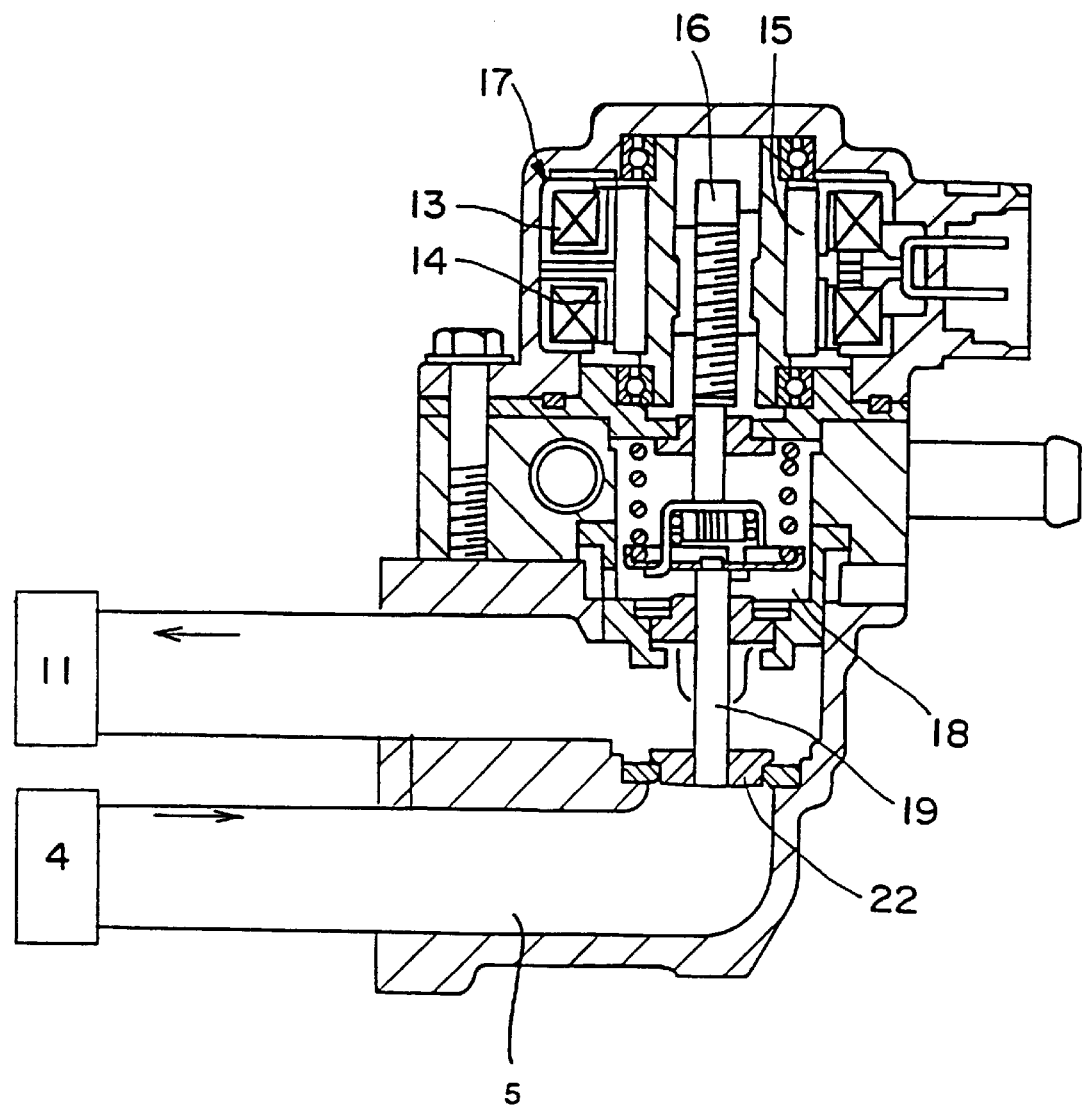
FIG. 3 is a view showing a structure of a flow rate control valve.

A recirculation pipe 5 is connected to the downstream side of the adsorbent 42 in the flow path A. The recirculation pipe 5 is connected to a serge tank 11 provided in an intake pipe of the engine and is used for the exhaust gas recirculation (EGR). A flow rate control valve (EGR valve) 10 is mounted in the midway of the recirculation pipe 5. As shown in FIG. 3, the flow rate control valve 10 is provided with a stator 14 composed of a four-phase magnetically exciting coil 13, a magnetized cylindrical rotor 15 which rotates within the stator 14, and a stepper motor 17 having a rod 16 which threadedly engages with in the cylindrical rotor 15 and projects and retracts in accordance with the rotation of the cylindrical rotor 15. A movable plate 18 which is spring-biased in a direction in which the rod 16 is projected is mounted at the tip end of the rod 16 of the stepper motor 17. Furthermore, a valve 22 which is seated to the seat within the recirculation pipe 5 is provided at the tip end of a valve rod 19 which is in contact with or out of contact with the movable plate 18.

In the thus constructed flow rate control valve 10, the movable plate 18 and the rod 16 are normally biased in the advance direction and the valve 22 of the valve rod 19 is seated to the seat to interrupt the flow path within the recirculation pipe 5.

Then, when the electric supply is effected, in order, to each phase of the four-phase magnetically exciting coil 13 of the stepper motor 17, in the flow rate control valve 10, the cylindrical rotor 15 is rotated to thereby retract the rod 16. Corresponding to this movement, the valve 22 is opened. In this case, by controlling the order of the electric supply to each phase of the magnetically exciting coil 13, it is possible to change the projecting/retracting direction and the amount of the movement (opening degree of the valve 22) of the rod 16, and to control the flow path opening area of the recirculation pipe 5, i.e., the flow rate of the recirculation pipe 5.

The recirculation pipe 5 and the flow rate control valve 10 realize the recirculation means according to the present invention.

Also, a bypass valve 40 for selectively opening/closing the flow path A and the flow path B is mounted in the outlet portion C of the adsorbent sleeve 4. The bypass valve 40 is connected through a lever 43 and a diaphragm chamber 41 mounted outside the adsorbent sleeve 4.

The lever 43 rotates about a furculum 44. When the end of the lever 43 on the side of the diaphragm chamber 41 is lowered, the bypass valve 40 is lifted by the end portion of the lever 43 on the side of the bypass valve 40. As a result, the flow path B is opened and the flow path A is closed.

On the other hand, when the end of the lever 43 on the side of the diaphragm chamber 41 is lifted, the bypass valve 40 is lowered by the end portion of the lever 43 on the side of the bypass valve 40. As a result, the flow path A is opened and the flow path B is closed.

Here, as shown in FIG. 1, a pipe 7 whose one end is connected to an intake pipe (not shown) of the engine is connected at the other end to the above-described diaphragm chamber 41 so that a negative pressure within the intake pipe may be introduced to the engine. In the midway of the pipe 7, there are connected a check valve 6 for allowing only the negative pressure to be applied from intake pipe side to the diaphragm chamber side, and a vacuum switching valve VSV for closing the pipe 7 when a current is supplied thereto and for closing the pipe 7 when a current is not supplied thereto.

If no electric power is, for example, supplied to the vacuum switching valve VSV (during non-electric power supply), the vacuum switching valve VSV closes the pipe 7, so that the negative pressure to the diaphragm chamber 41 is interrupted and the diaphragm chamber 41 is released to the atmosphere. In this case, the end portion of the lever 43 on the side of the diaphragm chamber 41 is lowered by the spring force of the diaphragm per se. As a result, the end portion of the lever 43 on the bypass valve side lifts the bypass valve 40. As a result, the bypass valve 40 closes the flow path A and opens the flow path B.

On the other hand, if an electric power is supplied to the vacuum switching valve VSV (during electric power supply), the vacuum switching valve VSV opens the pipe 7, so that the negative pressure is introduced to the diaphragm chamber 41. In this case, the diaphragm chamber 41 lifts the end portion of the lever 43 on the side of the diaphragm chamber 41. When the end portion of the lever 43 on the diaphragm chamber 41 is lifted, the lever 43 is rotated about the furculum 44, and the end portion of the lever 43 on the side of the bypass valve 40 lowers the bypass valve. The bypass valve 40 opens the flow path A and closes the flow path B.

The above-described bypass valve 40, diaphragm chamber 41 and vacuum switching valve VSV realize the passage switching means according to the present invention.

Figure 4:
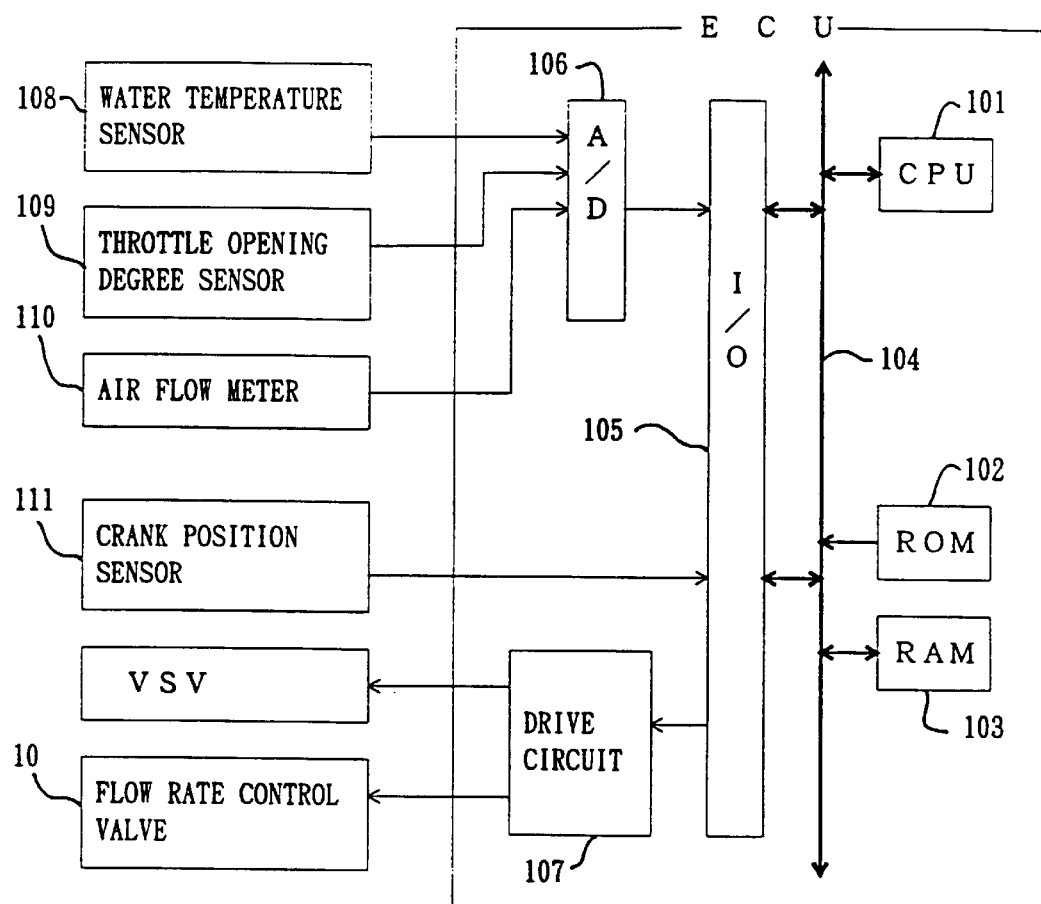
FIG. 4 is a schematic structure view showing a control system of an automotive vehicle to which an exhaust gas purifying apparatus for an internal combustion engine according to the present invention is applied.

Subsequently, the controller system for controlling the above-described exhaust system will be described with reference to FIG. 4. The controller system includes a water temperature sensor 108, a throttle opening degree sensor 109, an air flow meter 110, and a crank position sensor 111 each of which is connected to an electronic control unit (ECU) 100.

The water temperature sensor 108 realizes the water temperature detecting means according to the present invention and detects a temperature of cooling water for the engine 1.

The throttle opening degree sensor 109 outputs a voltage in proportion to the opening degree of the throttle valve provided in the intake pipe of the engine 1. The output signal is used for discriminating whether or not the engine 1 is in the idle condition.

The air flow meter 110 realizes the operational condition detecting means together with the crank position sensor 111 to be described later and outputs a voltage in proportion to an air amount Ga sucked to the engine 1.

The crank position sensor 111 outputs a pulse signal for every predetermined angular rotation of the crank shaft. The output signal is used for calculating the revolutions per minute NE of the engine 1. Furthermore, the output signal of the crank position sensor 111 is used for calculating the intake air amount GN per one turn of the engine 1 together with the output signal of the air flow meter 110. The calculated RPM NE and the intake air amount GN per one turn are used as data representative of the load condition of the engine 1. Thus, the above-described position sensor 111 and the air flow meter 110 are used to realize the operational condition detecting means according to the present invention.

The ECU 100 controls the above-described exhaust system on the basis of the signals from the respective sensors. For this, an ECU for a fuel injection control may be used or an ECU specialized for the exhaust gas purifying apparatus may be used.

The ECU 100 is provided with CPU 101, ROM 102, RAM 103 and input/output (I/O) port 105. These are connected to bus 104. A drive circuit 107 and an A/D converter 106 are connected to the input port (I/O) 105.

Figure 5:
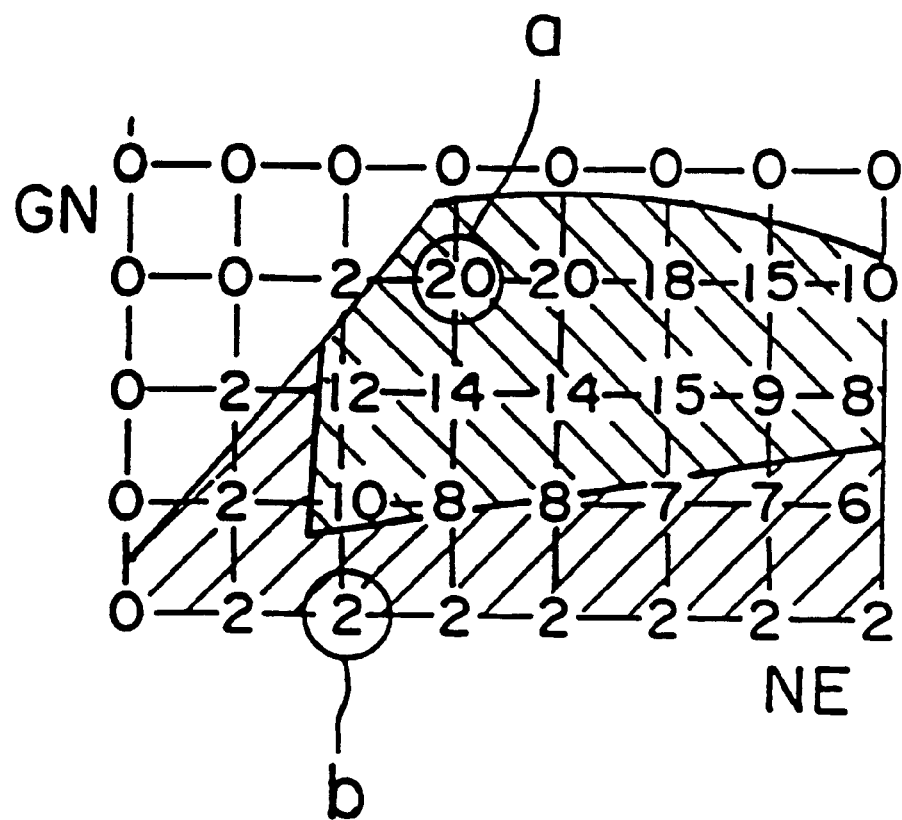
FIG. 5 is a view showing a relationship between an engine load condition and a valve opening degree of the flow rate control valve.

The above-described ROM 102 stores therein various control maps and application programs to be executed by the CPU 101. For example, as shown in FIG. 5, the control map of the ROM 102 represents the relationship between the load condition determined by the intake air amount GN per one revolution of the engine 1 and the engine RPM NE and the number of steps corresponding to an opening degree (recirculation amount) of the flow rate control valve 10. In this map A, in the case where the intake air amount GN per one revolution is kept constant, if the engine RPM NE is increased, the number of the steps is increased so that the recirculation amount is increased. Also, in the case where the intake air amount GN per one revolution is kept constant, if the intake air amount GN is increased, the number of the steps is increased so that the recirculation amount is increased. For instance, in case of the intake air amount GN and the engine RPM NE (load region a in FIG. 5) corresponding to the operational condition in which the throttle opening degree is substantially kept constant in the region in the light load to the middle load, "20" is selected as the target number of the steps for the flow rate control valve 10. On the other hand, in case of the intake air amount GN and the engine RPM NE (load region b in FIG. 5) corresponding to the operational condition in which the throttle opening degree is closed for deceleration or inertia run, since the amount of the intake air amount GN is decreased, "2" is selected as the target number of the steps for the flow rate control valve 10. Incidentally, although the number of the steps is set to the smaller one since the torque of the engine 1 is regarded as an important factor in the map A exemplified in FIG. 5, inversely, it is possible to set the number of the steps to a larger one in the case where the recirculation is regarded as an important factor.

Figure 6:
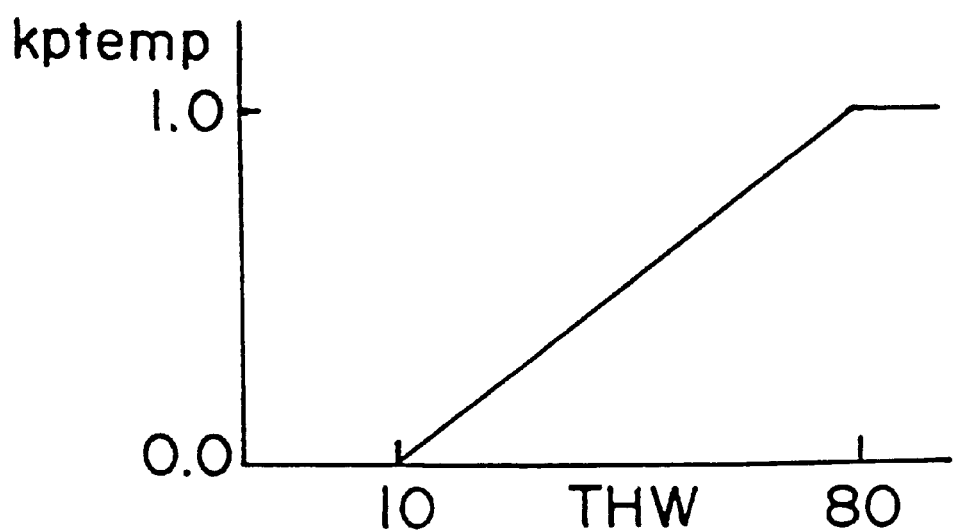
FIG. 6 is a view showing a relationship between a temperature THW of engine cooling water and a compensation coefficient kptemp.

Also, another control map B is shown in FIG. 6 which represents a relationship between a temperature THW of the cooling water and an coefficient kptemp. The coefficient kptemp is a compensation coefficient multiplied to the target step number specified by the map A. For instance, when the cooling water temperature THW is low as in the case where the engine 1 is started in the cold condition, the combustion of the engine 1 is unstable and if the large recirculation amount is effected, the combustion temperature of the engine 1 is lowered so that the torque is varied and the engine is stalled. It is therefore necessary to compensate for the recirculation amount toward the decreased side. On the other hand, the engine 1 combustion is stable as the cooling water temperature THW rises. Accordingly, it is necessary to compensate for the recirculation amount as the cooling water temperature rises.

The above-described maps A and B and the CPU 101 realize the recirculation amount changing means according to the present invention.

Furthermore, the ROM 102 stores, as a control map, a map C (not shown) representative of a relationship between the cooling water temperature THW when the engine is started and a period of time (hereinafter referred to as a catalyst activation time) from a time of the engine start until the catalysts 3a and 3b are activated. This map C and the CPU 101 constitute the activation discriminating means according to the present invention. Namely, the operation time period from the start of the engine 1 reaches the catalyst activation time, it is judged that the catalysts 3a and 3b are activated, whereas the operation time period of the engine is shorter than the catalyst activation time, it is judged that the catalysts 3a and 3b are not activated.

The CPU 101 operates in accordance with the application program of the ROM 102 and controls the flow rate control valve 10 and the vacuum switching valve VSV through the above-described drive circuit 107.

The RAM 103 stores therein, the signals from the temperature sensor 108, the throttle opening degree sensor 109, the air flow meter 110 and the crank position sensor 111 and the calculation results of the CPU 101 (for example, the intake air amount GN per one revolution, the engine RPM NE and the like). The signals from the respective sensors are rewritten as newest signals for every constant time period (for example, at every output of the crank position sensor 111).

Also, the RAM 103 has a region for an idle identification flag Xidle for identifying whether the engine 1 is in the idle condition or not (in the idle condition: Xidle=1, in the off idle condition: Xidle=0), warming-up completion flag Xthwon representing whether the temperature of the cooling water exceeds the warming-up completion temperature or not (after warming-up completion: Xthwon=1, before warming-up completion Xthwon=0), and an EGR flag XEGR for identifying whether the execution conditions for the exhaust gas recirculation (EGR) are met or not (when the execution conditions are met: XEGR=1, when the execution conditions are not met: XEGR=0). These flags are set or reset by the CPU 101.

For the method for judgement of the idle condition, there is provided a method for discriminating whether the signal from the throttle opening degree sensor 109 shows "0" or not (namely, whether the opening degree of the throttle valve is "0" or not), a method for discriminating whether the idle switch is turned on or not using an idle switch mounted on the throttle opening degree sensor 109, or the like.

Then, for the method of judgement of the warming-up completion condition, there is a method for discriminating whether or not the signal from the temperature sensor 108 exceeds a threshold value (for example, 80° C.) set in advance.

Also, with respect to the execution conditions of the EGR, for instance, there are exemplified conditions whether a predetermined period of time has lapsed from the engine start or not, whether the warming-up of the engine has been completed or not, whether the RPM of the engine 1 is equal to or less than the predetermined RPM or not, whether the engine is in the off-idle condition or not, or the like.

Furthermore, the RAM 103 has a region for storing therein the target step number read out from the map A of the ROM 102, or the coefficient kptemp read out from the map B.

The A/D converter 106 converts the output signals from the water temperature sensor 108, the throttle opening degree sensor 109, and the air flow meter 110 from the analog signals into the digital signals and inputs the converted signals into the I/O port 105.

The drive circuit 107 is connected to the flow rate control valve 10 and the vacuum switching valve VSV. Then, when the drive circuit 107 receives from the CPU 101 an electric supply order comparison signal for driving the flow rate control valve 10 up to the target step number, the drive circuit 107 drives the flow rate control valve 10 in accordance with the signal. Also, when the drive circuit 107 receives from the CPU 101 a switching signal between an electric supply and non-electric supply of the vacuum switching valve, the drive circuit 107 drives the vacuum switching valve VSV in accordance with the signal.

The operation of the embodiment will now be described.

The prerequisite operation of the exhaust gas purifying apparatus for an internal combustion engine in accordance with the embodiment will now be described.

When the engine 1 is started in the cold state (when the catalysts 3a and 3b are not activated), the CPU 101 supplies the vacuum switching valve VSV with an electric power from the drive circuit 107. The vacuum switching valve VSV which is in the electric supply condition receiving the electric power opens the flow path A within the adsorbent sleeve 4 and closes the flow path B. Incidentally, in the start of the engine 1, the flow rate control valve 10 of the recirculation pipe 5 is kept under the fully closed condition. At this time, all the exhaust gas discharged from the catalysts 3a and 3b is discharged to the exhaust pipes 8a and 8b through the flow path A. The hydrocarbon (HC) which has not been oxidized by the catalysts is adsorbed to the adsorbent 42 in the flow path A.

Also, in the engine start, the CPU 101 reads out the output signal (cooling water temperature) from the water temperature sensor 108. Then, the CPU 101 accesses the map C of the ROM 102, reads out the catalyst activation time corresponding to the cooling water temperature and compares the catalyst activation time with the operation time period from the engine start until the current point. When the operational time period of the engine 1 reaches the catalyst activation time, the CPU 101 interrupts the electric supply from the drive circuit 107 to the vacuum switching valve. The vacuum switch valve VSV to which the electric supply is interrupted and kept in the non-electric supply condition closes the flow path A and opens the flow path B within the adsorbent sleeve 4. In this case, the exhaust gas purified by the activated catalysts 3a and 3b is introduced into the exhaust pipes 8a and 8b through the flow path B within the adsorbent sleeve 4 and flows into the mufflers 9a and 9b.

In this case, it is necessary to separate the hydrocarbon (HC), adsorbed in the adsorbent 42, away from the adsorbent and to perform the exhaust gas recirculation (EGR) to the serge tank 11 of the engine 1. However, if a large amount of exhaust gas recirculation is effected not in view of the operational condition of the engine 1, problems such as a torque variation or the like are induced. Inversely, if the amount of the exhaust recirculation is lowered, it is disadvantageous that it takes a long period of time to separate the hydrocarbon (HC). For this reason, it is preferable to control the amount of the recirculation exhaust gas in correspondence with the operational condition. Accordingly, in the embodiment, the CPU 101 executes the EGR control routine shown in FIG. 7.

First of all, the CPU 101 discriminates whether or not the bypass valve 40 closes the flow path A and the opens the flow path B; namely whether or not the catalysts 3a and 3b are activated (step 701).

In this case, if the CPU 101 judges that the bypass valve 40 opens the flow path A and closes the flow path B; namely that the catalysts 3a and 3b are not activated, the target opening degree (target step number) of the flow rate control valve 10 is set to "0" (step 708), and the closed condition of the flow rate control valve 10 is maintained (step 707). Namely, the recirculation is not performed.

On the other hand, in the above-described step 701, if the CPU 101 judges that the bypass valve 40 closes the flow path A and at the same time opens the flow path B; namely, that the catalysts 3a and 3b are activated, the process is advanced to step 702. In step 702, the CPU 101 accesses the RAM 103 and reads out the intake air amount GN per one revolution of the engine 1 and the RPM NE. Then, the CPU 101 accesses the map A of the ROM 102, and reads out the target step number (opening degree of the flow rate control valve 10) corresponding to the intake air amount GN per one revolution and the RPM NE. Furthermore, the CPU 101 writes the read-out target step number as the target opening degree in the RAM 103.

Subsequently, referring to the idle identification flag Xidle of the RAM 103, the CPU 101 discriminates whether the engine 1 is in the idle condition (Xidle=1) or in the off-idle condition (Xidle=0) (step 703).

If the idle identification flag of the RAM 103 is Xidle=0, referring to the warming-up completion flag Xthwon of the RAM 103, the CPU 101 discriminates whether the warming-up of the engine 1 is completed (Xthwon=1) or the warming-up of the engine 1 is not completed (Xthwon=0) (step 704).

If the warming-up completion flag of the RAM 103 is Xthwon=1, referring to the EGR flag XEGR of the RAM 103, the CPU 101 discriminates whether the EGR execution conditions are met (XEGR=1), or the EGR execution conditions are not met (XEGR=0) (step 705).

In this case, if the EGR flag of the RAM 103 is XEGR=1, the CPU 101 inputs into the drive circuit 107 the supply order comparison signal corresponding to the target opening degree (target step number) written in the RAM 103 and drives the flow rate control valve 10 to the target step number (step 707). Namely, the recirculation pipe 5 is opened in correspondence with the number of the target step number.

The process of the above-described steps 701, 702, 703 and 707 shows the regular exhaust gas recirculation (EGR) to be performed when the EGR execution conditions are met after the warming-up of the engine 1).

Also, in the above-described step 703, in the case where the idle identification flag of the RAM 103 is Xidle=1 (under the condition that the engine is kept in the idle condition), the CPU 101 jumps to the above-described step 707, inputs into the drive circuit 107 the supply order comparison signal corresponding to the target opening degree (target step number) written in the RAM 103 and drives the flow rate control valve 10 to the target step number. Namely, the recirculation pipe 5 is opened in correspondence with the number of the target step number.

Furthermore, in the above-described step 704, in the case where the warming-up completion flag of the RAM 103 is Xthwon=0, or in the above-described step 705, the EGR flag of the RAM 103 is XEGR=0 (in the case where the EGR execution conditions are not met), the CPU 101 reads out the cooling water temperature THW stored in the RAM 103, and thereafter accesses the map B of the ROM 102. Then, the CPU 101 reads out the coefficient kptemp corresponding to the cooling water temperature THW from the map B. Furthermore, the CPU 101 multiplies the target opening degree (target step number) of the RAM 103 by the coefficient kptemp to thereby calculate the new target opening degree (new target step number) (step 706). Then, the CPU 101 inputs into the drive circuit 107 the supply order comparison signal corresponding to the newly calculated target opening degree (new target step number) in the same order as in the above-described step 707, and drives the flow rate control valve 10 up to the target step number. As a result, in the case where the engine 1 warming-up has not been completed, or also in the case where the EGR execution conditions are not met, it is possible to perform the exhaust gas recirculation corresponding to the level of the cooling water temperature THW and the load condition of the engine 1 at that time.

Figure 8:
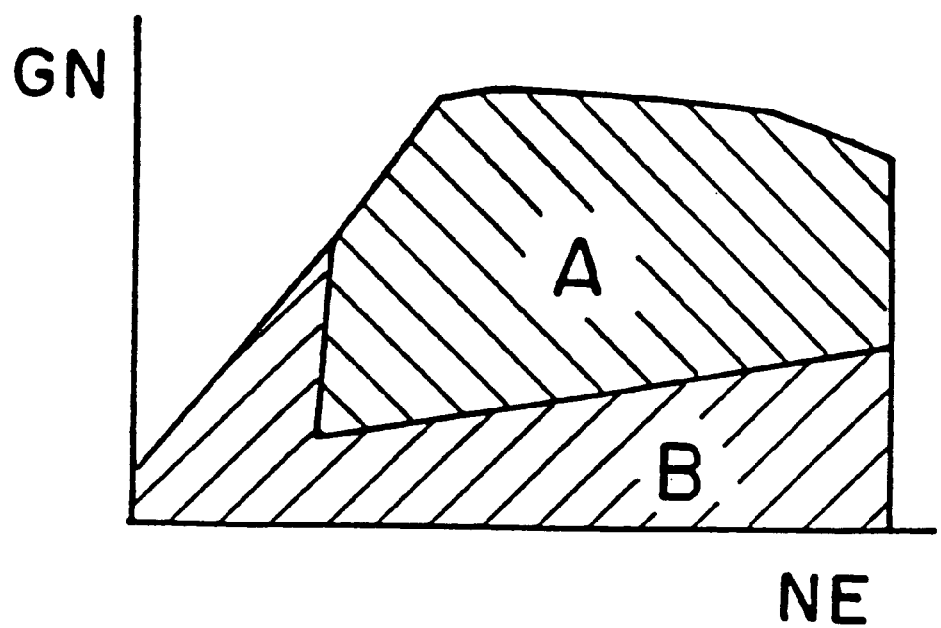
FIG. 8 is a view showing an EGR execution region in the off-idle condition and an exhaust recirculation execution region according to the present invention.

The relationship between the load condition of the engine 1 and the exhaust gas recirculation in the off-idle condition is shown in FIG. 8.

Figure 7:
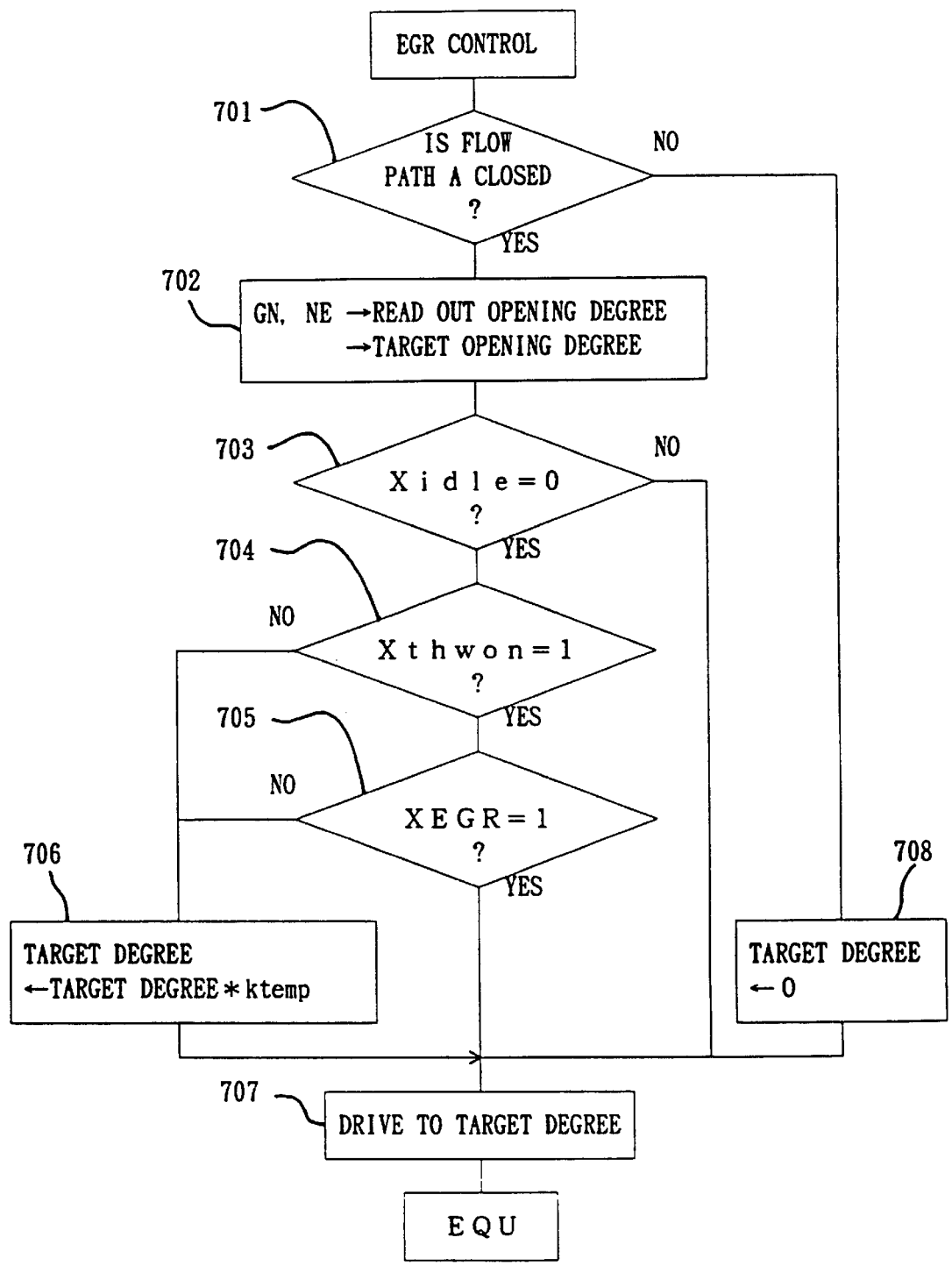
FIG. 7 is a flowchart showing an example of an exhaust gas recirculation (EGR) control routine.

In FIG. 8, the ordinate axis represents the intake air amount GN per one revolution of the engine 1 and the abscissa axis represents the RPM NE of the engine 1. Then, the region A in FIG. 8 shows a region where the normal exhaust gas recirculation (EGR) is to be performed, and the region B shows a region where the exhaust gas recirculation according to the present invention is to be performed. In the normal exhaust gas recirculation (EGR), unless the conditions of the steps 704 and 705 shown in FIG. 7 are met, the exhaust gas recirculation is not performed. However, in the exhaust gas purifying apparatus for an internal combustion engine according to the embodiment, even if the conditions of the steps 704 and 705 are not met, it is possible to perform the exhaust gas recirculation to an extent corresponding to the engine condition at that time (load condition or the load condition and cooling water temperature THW). In other words, in the exhaust gas purifying apparatus for an internal combustion engine according to the embodiment, since the exhaust gas recirculation is performed even in the load region (region B in FIG. 8) where the exhaust gas recirculation (EGR) is not to be performed in the normal exhaust gas recirculation process, it is possible to perform the exhaust gas recirculation in the broad range. It is possible to early separate and recirculate the unburnt gas components of the adsorbent 42. Also, in the embodiment, in the region B in FIG. 8, since the exhaust gas recirculation is performed to the extent corresponding to the condition of the engine 1, it is possible to stabilize the engine 1.

Thus, in accordance with the embodiment, it is possible to perform the exhaust gas recirculation without unstabilizing the operational condition in the broad range of the operational condition of the engine.

Figure 9:
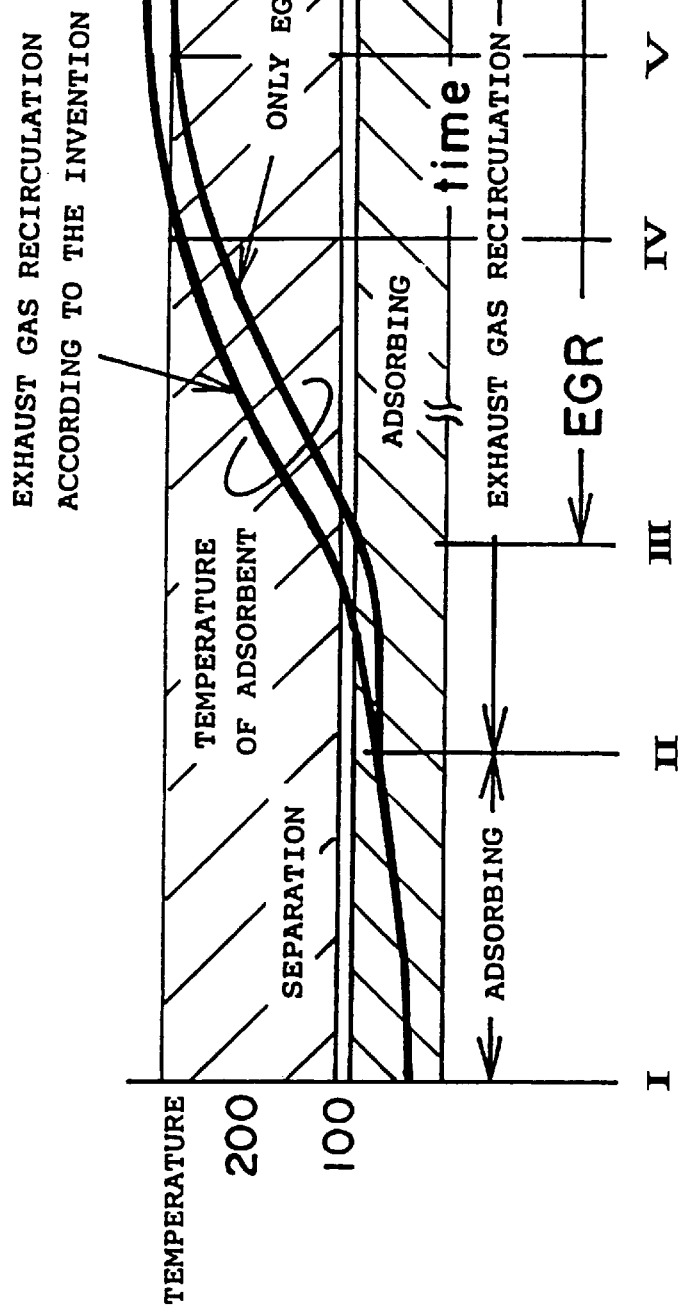
FIG. 9 is a view showing temperature characteristics of the adsorbent.

The temperature variation of the adsorbent 42 in the case where only the regular exhaust gas recirculation (EGR) process is only performed, and the temperature variation of the adsorbent 42 in the case where the exhaust gas recirculation process according to the embodiment is performed are shown in FIG. 9 in which the ordinate axis represents the temperature of the adsorbent 42 and the abscissa axis represent the time. In the case where only the normal exhaust gas recirculation (EGR) process is performed, since all the exhaust gas is caused to flow through the adsorbent 42 from the start of the engine 1 (i in FIG. 9) until the time when the catalysts 3a and 3b are activated (ii in FIG. 9), the temperature rise rate of the adsorbent 42 is high. However, since the exhaust gas is not caused to flow through the adsorbent 42 from the time when the catalysts 3a and 3b are activated (ii in FIG. 9) until the time of completion of the warming-up (iii in FIG. 9), the adsorbent 42 is heated only the heat transfer from the exhaust gas that flows through the flow path B, so that it takes a long time until the temperature reaches the separation temperature of the hydrocarbon (HC).

In contrast thereto, in the exhaust gas recirculation according to the embodiment, since the EGR is started from the time when the catalysts 3a and 3b are activated (ii in FIG. 9, before the completion of the warming-up), even before the warming-up, the part of the exhaust gas (the amount of the exhaust gas corresponding to the condition of the engine 1) is caused to flow through the adsorbent 42. In this case, the adsorbent 42 is directly heated by the part of the exhaust gas and the temperature reaches the separation temperature of the hydrocarbon (HC) for a short period of time.

In the exhaust gas purifying apparatus for an internal combustion engine according to the embodiment, it is possible to perform the exhaust gas recirculation from the early stage of the start of the engine 1 in view of the condition of the engine 1, and it is therefore possible to complete the regeneration process of the adsorbent in the earlier stage. Thus, a fear of the engine stall before the completion of the separation of the hydrocarbon (HC) is suppressed and it is thus possible to avoid the degradation of the performance of the adsorbent.

Embodiment 2

In the foregoing embodiment, the case where the compensation is effected in correspondence with the target opening degree determined in accordance with the load condition of the engine 1 or the cooling water temperature THW for the target opening degree has been explained. In this embodiment, the case where the target opening degree is compensated for by feeding back the combustion condition of the engine 1 will now be described.

For the method for judging the combustion condition of the engine 1, it is possible to exemplify the case where a period of time needed for the crank shaft to rotate through a predetermined angle immediately after the ignition of the mixture is monitored so that the combustion condition of the engine 1 is judged.

For instance, a MPU type magnetic pickup is used as a crank position sensor 111 for outputting a signal whenever the crank shaft of the engine 1 is rotated through 30° from a top dead center, and a period T30Dn of time from the time when the crank position sensor 111 detects the top dead center until the time when a next signal (outputted when the crank shaft is rotated from the top dead center through 30°) is outputted is written in the RAM 103 of the ECU 10. Then, a difference DTDCP (=T30Dn−T30Dn−1) between the time T30Dn−1 which has been expended for the previous rotation and the time T30Dn which has been expended for the current rotation is calculated.

In this case, if the current combustion condition is worse than the previous combustion condition, the difference DTDCP shows a positive value. However, since the value of the difference DTDCP shows a positive value depending upon the engine load change in some cases, in order to distinguish the case where the combustion condition is worse and the case where the engine load is changed, it is necessary to clarify the value that the difference DTDCP takes according to the change of the engine load.

Figure 10:
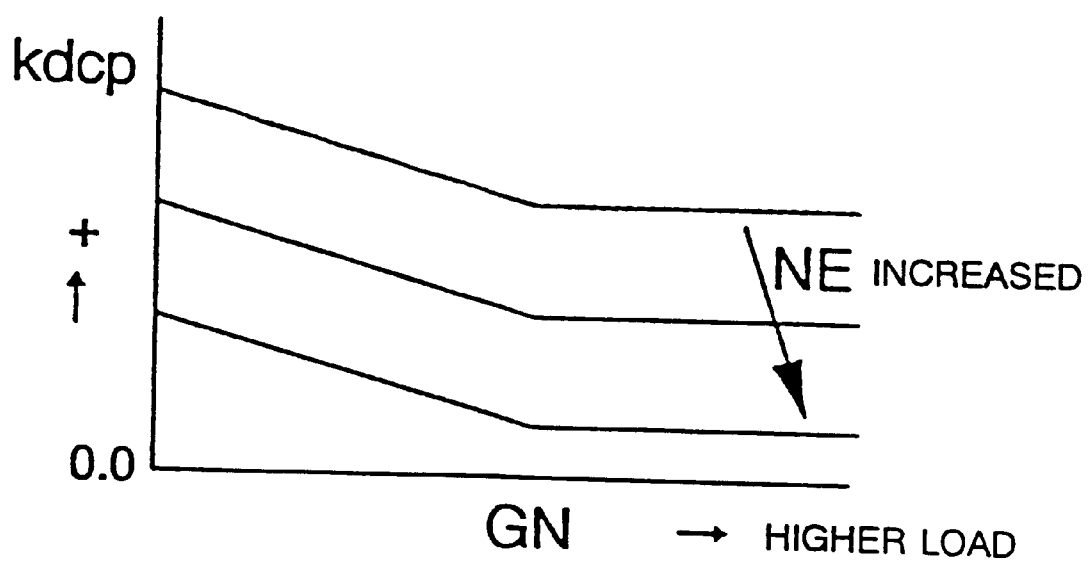
FIG. 10 is a view showing a relationship between an intake air amount GN per one revolution of an engine and a judgement constant kdcp.

In the exhaust gas purifying apparatus for an internal combustion engine, as shown in FIG. 10, the ROM 102 of the ECU 10 stores therein a map D representative of a relationship between the intake air amount GN per one revolution specified by the intake air amount Ga of the engine 1 and the engine RPM NE and the judgment constant kdcp specifying the allowable range of the difference DTDCP. In this case, the CPU 101 accesses the map D, reads out the judgement constant kdcp corresponding to the intake air amount GN per one revolution of the engine 1 and compares the read-out judgement constant kdcp with the difference DTDCP.

For example, if the CPU 101 judges that the value of the difference DTDCP is greater than the judgement constant kdcp, the CPU 101 judges that the combustion condition of the engine 1 becomes worse. On the other hand, if the CPU 101 judges that the value of the difference DTDCP is smaller than the judgement constant kdcp, the CPU 101 judges that the combustion condition of the engine 1 becomes stable.

The above-described crank position sensor 111, the CPU 101 and the map D constitute the combustion condition detecting means according to the present invention. The other structure thereof is the same as that of the foregoing embodiment, and hence the explanation therefor will be omitted.

The feed-back control for compensating for the valve opening amount of the flow rate control valve 10 by using the above-described combustion condition judgement method will now be described with reference to FIGS. 11 and 12.

Figure 11:
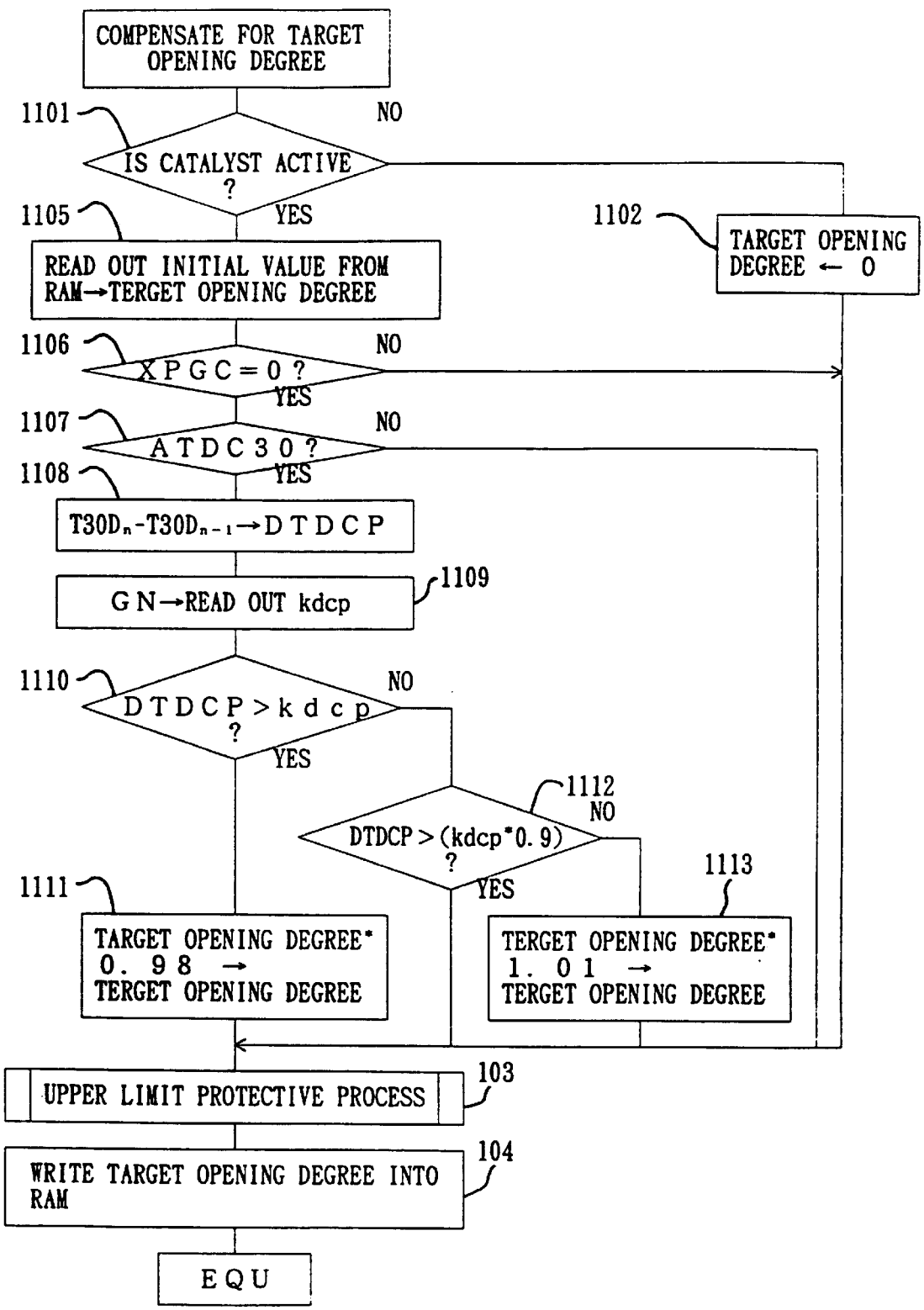
FIG. 11 is a flowchart showing an example of a target opening degree compensation routine in another embodiment.

FIG. 11 shows the target opening degree compensation routine for the exhaust gas recirculation which is executed by the CPU 101 whenever the crank position sensor 111 issues an output (every time the crank shaft is rotated through 30°).

First of all, the CPU 101 discriminates whether the catalysts 3a and 3b are activated (step 1101). In this case, if the catalysts 3a and 3b are not activated, the CPU 101 sets the target opening degree (target step number) of the flow rate control valve 10 to "0" (step 1102).

Then, the CPU 101 executes the upper limit protective process of the target opening degree (target step number) "0" set by the above-described step 1102 (step 1103). The upper limit protective process is a process for preventing the target opening degree (target step number) from exceeding the allowable range due to the erroneous detection of each sensor. For example, the CPU 101 discriminates whether or not the target opening degree (target step number) set in the above-described step 1102 is equal to or less than the upper limit. If the target opening degree (target step number) is equal to or less than the upper limit, the above-described target opening degree is written in the RAM 103 as the target opening degree for the exhaust gas recirculation. On the other hand, if the target opening degree (target step number) is greater than the upper limit, the CPU 101 writes the above-described target opening degree in the RAM 103 as the target opening degree for the exhaust gas recirculation (step 1104).

However, since the target step number "0" is set in the above-described step 1102, the CPU 101 writes the target step number "0" to the RAM 103 without any modification.

If the catalysts 3a and 3b are activated while the above-described steps 1101, 1102, 1103 and 1104 are repeatedly executed, the CPU 101 judges that the catalysts 3a and 3b are activated in the step 1101 and advances to the step 1105.

In the step 1105, the CPU 101 reads out the initial value of the target opening degree (target step number) stored in advance in the RAM 103. The initial value is a small value (for example, step number "1") at which the combustion condition of the engine 1 does not become worse.

Next, the CPU 101 refers to the value of the recirculation completion flag XPGC stored in the RAM 103 (step 1106). The recirculation completion flag XPGC is a flag showing whether or not the exhaust recirculation has already been completed (in the case where the exhaust recirculation has been completed: XPGC=1, in the case where the exhaust recirculation has not been completed: XPGC=0, namely, whether the regeneration of the adsorbent 42 has been completed or not.

In the above-described step 1106, if it is judged that the recirculation completion flag of the RAM 103 is XPGC=0, the CPU 101 accesses the RAM 103, and discriminates whether or not the output of the crank position sensor 111 is a signal representative of 30° after the top dead center (step 1107).

In the above-described step 1107, if it is judged that the output of the crank position sensor 111 is the signal representative of 30° after the top dead center, the CPU 101 calculates the time period T30Dn which have been expended from the top dead center to 30° after the top dead center, at the same time accesses the RAM 103 to read out the time period T30Dn−1 needed for the previous rotation. Then, the CPU 101 subtracts the time period T30Dn−1 needed for the previous rotation from the time period T30Dn needed for the current rotation and calculates the difference DTDCP (step 1108).

Also, the CPU 101 accesses the RAM 103 and reads out the intake air amount GN per one revolution of the engine 1. Then, the CPU 101 accesses the map D of the ROM 102 and reads out the judgement constant kdcp corresponding to the intake air amount GN per one revolution (1109).

Then, the CPU 101 compares the difference DTDCP calculated in the above-described step 1108 with the judgement constant kdcp read out in the above-described step 1109 (step 1110).

In the above-described step 1110, if the difference DTDCP is greater than the judgement constant kdcp, the CPU 101 judges that the combustion condition of the engine 1 becomes worse due to the exhaust recirculation. Then, the CPU 101 reads out the target opening degree (target step number) for the exhaust gas recirculation stored in the RAM 103, and multiplies the target opening degree (target step number) by the compensation coefficient less than 1 (for example, 0.98), and calculates a new target opening degree (new target step number) (step 1111).

Subsequently, the CPU 101 executes the upper limit protective process as in the step 1103 as to the new target opening degree (new target step number). The value obtained by the upper limit protective process is written in the RAM 103 as the target opening degree for the new exhaust recirculation.

On the other hand, if it is judged that the difference DTDCP is smaller than the judgement constant kdcp, the CPU 101 compares the difference DTDCP with the value obtained by multiplying the judgement constant kdcp by the coefficient less than 1 (for example, 0.9) (step 1112).

In the above-described step 1112, if it is judged that the difference DTDCP is greater than the value obtained by multiplying the judgement constant kdcp by the coefficient less than 1, the CPU 101 judges that the combustion condition of the engine 1 is stable and the recirculation amount is suitable. The CPU does not execute the compensation of the target opening degree.

On the other hand, in the above-described step 1112, if it is judged that the difference DTDCP is equal to or smaller than the value obtained by multiplying the judgement constant kdcp by the coefficient less than 1, the CPU 101 judges that the combustion condition of the engine 1 is stable and the recirculation amount may be increased. In this case, the CPU 101 multiplies the target opening degree (target step number) stored in the RAM 103 by the coefficient not less than "1" (for example, 1.01) to thereby calculate the new target opening degree (new target step number) (step 1113).

Then, in the same manner as in the above-described step 1103, the CPU 101 executes the upper limit protective process for the target opening degree newly calculated (new target step number), and writes the value obtained through the upper limit protective process as the target opening degree for the new exhaust recirculation in the RAM 103.

Figure 12:
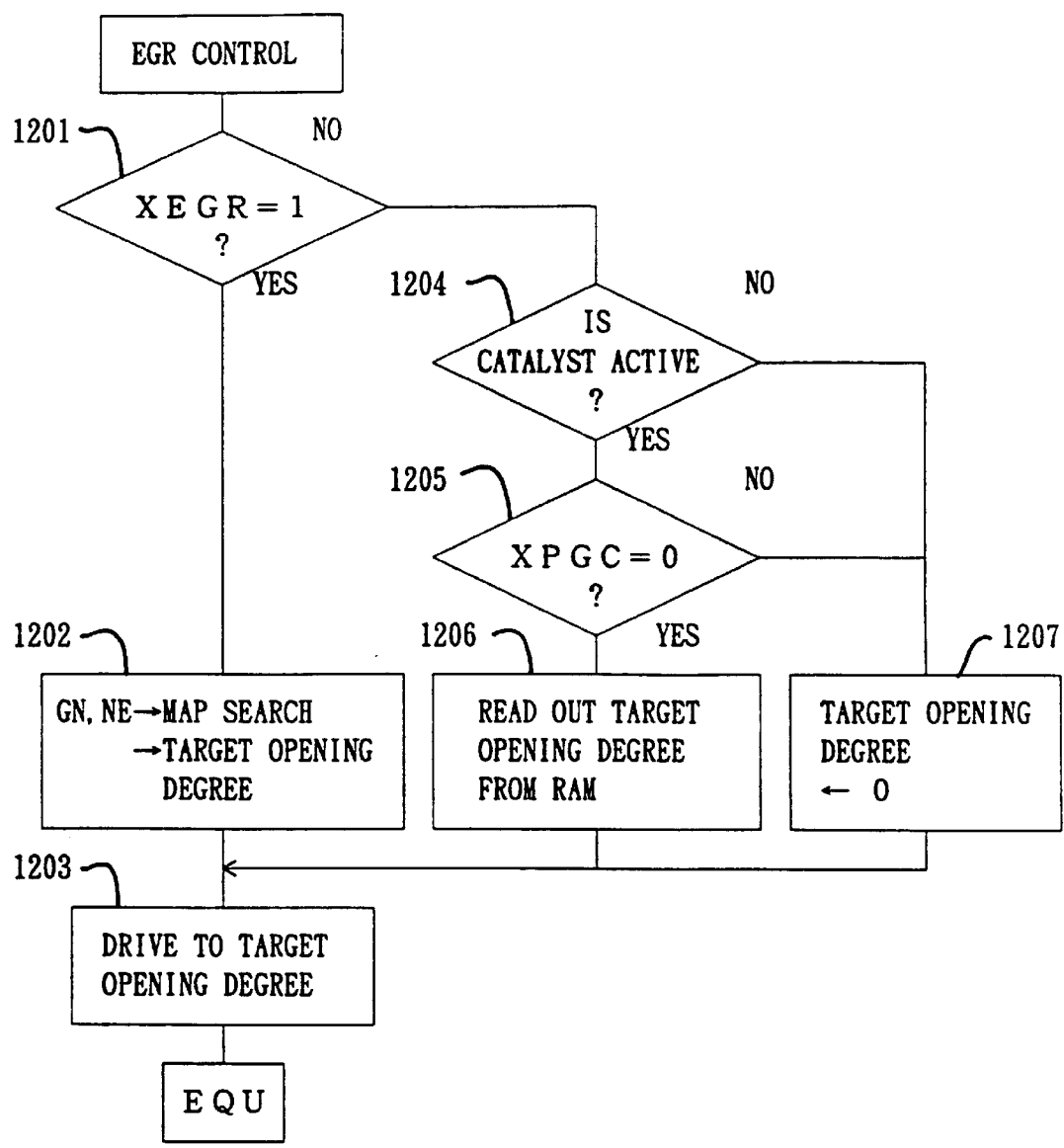
FIG. 12 is a flowchart showing an EGR control routine in accordance with still another embodiment.

Also, the CPU 101 executes the EGR control routine shown in FIG. 12 for every predetermined time period (for example, every 16 msec).

The CPU 101 refers to the EGR flag XEGR of the RAM 103 and discriminates whether the conditions for the EGR execution are met (XEGR=1) or the conditions for the EGR execution are not met (XEGR=0) (step 1201).

In the above-described step 1201, if it is judged that the EGR flag is XEGR=1, the CPU 101 reads from the intake air amount GN per one revolution and the engine RPM NE from the RAM 103. Then, the CPU 101 accesses the map A of the ROM 102 and reads out the target step number (target opening degree of the flow rate control valve 10) corresponding to the intake air amount GN and the engine RPM NE (step 1202).

Subsequently, the CPU 101 inputs into the drive circuit 107 the supply order comparison signal corresponding to the target step number read out in the above-described step 1202 and drives the flow rate control valve 10 up to the target step number (step 1203). Namely, the flow rate control valve 10 opens the recirculation pipe 5 to such an extent corresponding to the target step number.

The process thus far described show an exhaust gas recirculation (EGR) process to be carried out after the completion of the warming-up.

In the above-described step 1201, if it is judged that the EGR flag of the RAM 103 is XEGR=0, the CPU 101 discriminates whether or not the catalysts 3a and 3b are activated (step 1204).

In the above-described step 1204, if it is judged that the catalysts 3a and 3b are not activated, the CPU 101 set the target opening value (target step number) of the flow rate control valve 10 as "0" (step 1207), and maintains the closed condition of the flow rate control valve. Namely, the exhaust recirculation is not executed.

On the other hand, in the above-described step 1204, if it is judged that the catalysts 3a and 3b are activated, the CPU 101 refers to the exhaust recirculation completion flag XEGR of the RAM 103, and discriminates whether or not the exhaust recirculation has already been completed, i.e., whether or not the regeneration of the adsorbent 42 has been completed (step 1205).

In the above-described step 1205, if it is judged that the recirculation completion flag of RAM 103 is XPGC=0, the CPU 101 accesses the RAM 103 and reads out the target opening degree (target step number) for the exhaust recirculation obtained by executing the routine shown in FIG. 11 (step 1206).

Then, the CPU 101 executes the same process as in the above-described step 1203, inputs into the drive circuit 107 the supply order comparison signal corresponding to the target opening degree (target step number) for the exhaust recirculation read out from the RAM 103, and drives the flow rate control valve 10 up to the target step number. Namely, the flow rate control valve 10 opens the recirculation pipe 5 to such an extent corresponding to the target step number.

Thus, when the regeneration process of the adsorbent 42 is completed, the CPU 101 judges the completion of the exhaust recirculation in the above-described step 1205, and sets the target opening degree (target step number) to "0" in the same way as in the above-described step 1207. Then, the CPU 101, in the same way as in the process in the above-described step 1203, inputs into the drive circuit 107 the supply order comparison signal corresponding to the target opening degree "0" (target step number), and drives the flow rate control valve 10 up to the target step number "0". Namely, the flow rate control valve 10 closes the recirculation pipe 5 according to the target step number "0".

In the exhaust gas purifying apparatus for an internal combustion engine according to the present embodiment, it is possible to determine the amount of the exhaust recirculation in accordance with the load condition of the engine and to compensate for the amount of the exhaust gas to be recirculated by feeding back the combustion condition of the engine 1. It is thus possible to suppress the misfire or the engine stall due to the exhaust gas recirculation.

Incidentally, although, in the embodiment, for the method for judging the combustion condition of the engine 1, a method is adapted to monitor the time period needed for the crank shaft of the engine 1 to rotate through the constant angle, it is also possible to use a method to supervise an ion current within the combustion changer, a combustion pressure, an output of an air/fuel ratio sensor mounted upstream of the catalysts in the exhaust pipe to detect the combustion condition (misfire condition).

Also, in the embodiment, the stepper motor type valve is exemplified as the flow rate control valve. Of course, the application is not limited thereto. For example, it is possible to use a vacuum switching valve or the like to be duty-controlled.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. An exhaust gas purifying apparatus for an internal combustion engine, comprising:
    an exhaust pipe connected to the internal combustion engine;
    a first exhaust flow path and a second exhaust flow path coupled to said exhaust pipe;
    a path switching means for introducing the exhaust gas into at least one of said first exhaust flow path and said second exhaust flow path;
    an adsorbing means disposed in said first exhaust flow path for adsorbing unburnt gas components contained in the exhaust gas;
    a recirculating means for recirculating at least part of the exhaust gas discharged from said adsorbing means to an intake side of the internal combustion engine;
    an operational condition detecting means for detecting an operational condition of the internal combustion engine; and
    a recirculation amount changing means for changing an amount of the exhaust gas to be recirculated by said recirculating means in accordance with the operational condition detected by said operational condition detecting means.

2. The exhaust gas purifying apparatus according to claim 1, wherein said operational condition detecting means detects a load condition of the internal combustion engine, and said recirculation amount changing means changes the amount of the exhaust gas to be recirculated by said recirculating means in accordance with the load condition detected by said operational condition detecting means.

3. The exhaust gas purifying apparatus according to claim 1, wherein said recirculating means recirculates, when the internal combustion engine is warming-up, at least part of the exhaust gas discharged from said adsorbing means to an intake side of the internal combustion engine.

4. The exhaust gas purifying apparatus according to claim 1, further comprising an activation discriminating means for discriminating whether or not a catalyst which is mounted on said exhaust pipe is activated, wherein said recirculating means starts the recirculation of the exhaust gas under the condition that the activation discriminating means judges that the catalyst is activated.

5. The exhaust gas purifying apparatus according to claim 4, wherein said activation discriminating means judges that the catalyst is activated when an operation time period from the start of the internal combustion engine is equal to or longer than a predetermined time period, and judges that the catalyst is not activated when the operation time period from the start of the internal combustion engine is shorter than the predetermined time period.

6. The exhaust gas purifying apparatus according to claim 1, further comprising a water temperature detecting means for detecting a temperature of cooling water for an internal combustion engine, wherein said recirculating amount changing means compensates for the amount of the exhaust gas to be recirculated in accordance with the temperature of cooling water detected by said water temperature detecting means.

7. The exhaust gas purifying apparatus according to claim 6, wherein said recirculating amount changing means compensates for the recirculating amount so that the amount of the exhaust gas to be recirculated is decreased in the case where the temperature of the cooling water is lower than a predetermined temperature.

8. An exhaust gas purifying apparatus for an internal combustion engine, comprising:

an exhaust pipe connected to the internal combustion engine;

a first exhaust flow path and a second exhaust flow path coupled to said exhaust pipe;

a path switching means for introducing the exhaust gas into at least one of said first exhaust flow path and said second exhaust flow path;

an adsorbing means disposed in said first exhaust flow path for adsorbing unburnt gas components contained in the exhaust gas;

a recirculating means for recirculating at least part of the exhaust gas discharged from said adsorbing means to an intake side of the internal combustion engine;

a combustion condition detecting means for detecting a combustion condition of the internal combustion engine; and a recirculation amount changing means for changing an amount of the exhaust gas to be recirculated by said recirculating means in accordance with the combustion condition detected by said combustion condition detecting means.

9. The exhaust gas purifying apparatus according to claim 8, wherein said combustion condition detecting means detects, when the internal combustion engine is warming-up, the combustion condition of the internal combustion engine, and said recirculation amount changing means changes the amount of the exhaust gas to be recirculated by said recirculating means in accordance with the combustion condition detected by said combustion condition detecting means.

10. An exhaust gas purifying method for an internal combustion engine, comprising the following steps of:

introducing exhaust gas from the internal combustion engine into at least one of two exhaust flow paths coupled to an exhaust pipe;

adsorbing unburnt gas components contained in the exhaust gas by an adsorbing means provided in said one of exhaust flow paths;

recirculating at least part of the exhaust gas from said adsorbing means to an intake side of the internal combustion engine;

detecting an operational condition of the internal combustion engine; and changing an amount of the exhaust gas to be recirculated to the intake side of the internal combustion engine in accordance with the operational condition of the internal combustion engine.

11. The exhaust gas purifying method according to claim 10, wherein the operational condition of the internal combustion engine is a load condition of the internal combustion engine which has been warming-up.

12. An exhaust gas purifying method for an internal combustion engine, comprising the following steps of:

introducing exhaust gas from the internal combustion engine into at least one of two exhaust flow paths coupled to an exhaust pipe;

adsorbing unburnt gas components contained in the exhaust gas by an adsorbing means provided in said one of exhaust flow paths;

recirculating at least part of the exhaust gas from said adsorbing means to an intake side of the internal combustion engine;

detecting a combustion condition of the internal combustion engine; and changing an amount of the exhaust gas to be recirculated to the intake side of the internal combustion engine in accordance with the combustion condition of the internal combustion engine.

13. The exhaust gas purifying method according to claim 12, wherein the combustion condition is a combustion condition of the internal combustion engine which has been warming-up.

* * * * *